July 17, 1923.
H. B. DAVIS
GLASS CUTTING MACHINE
Filed Aug. 16, 1920
1,462,030
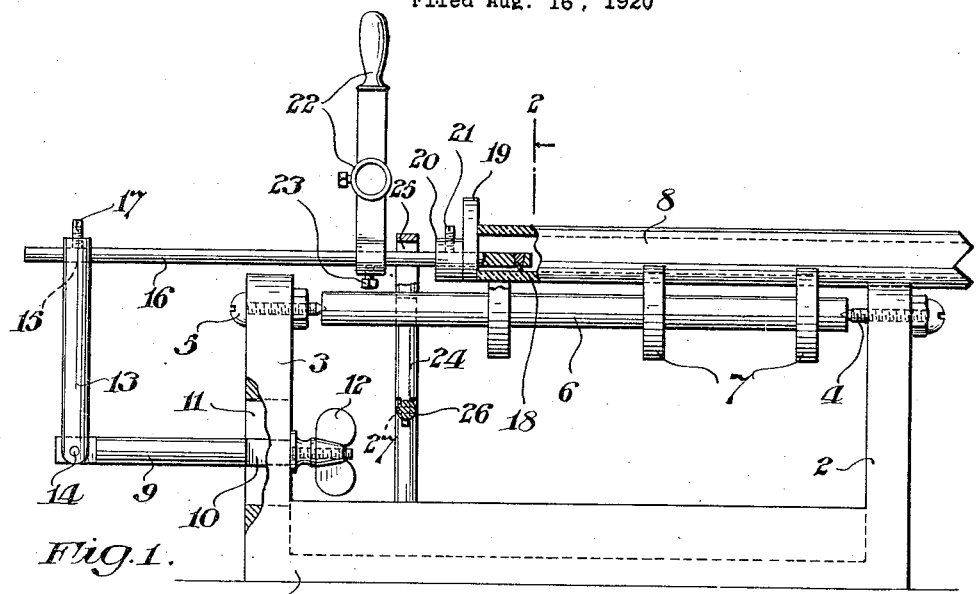
Fig. 1.
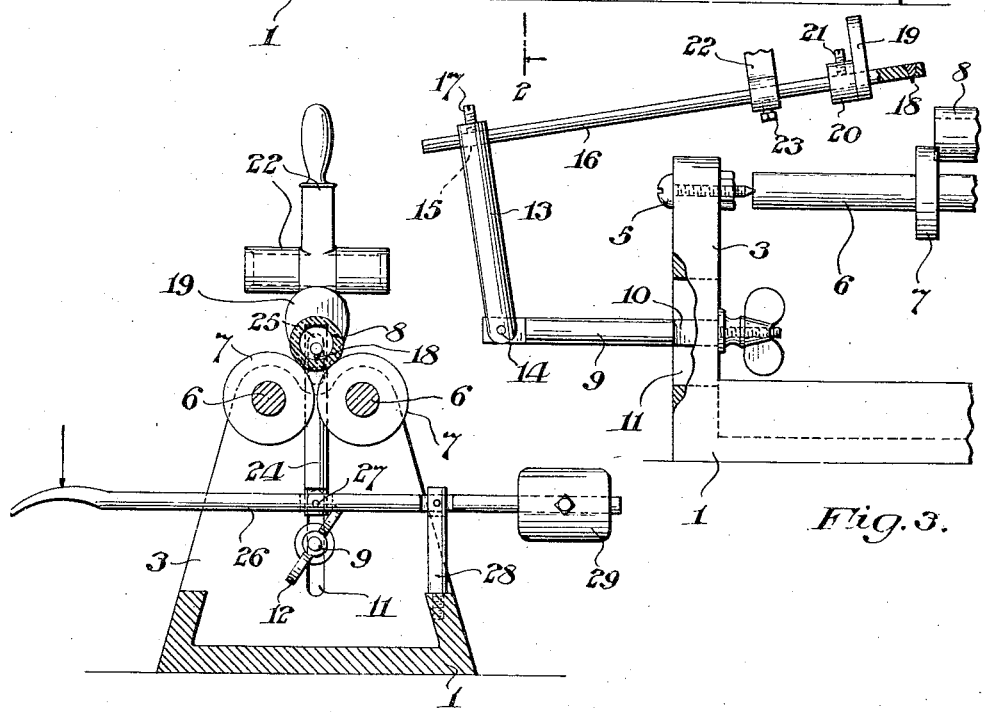
Fig. 2.
Fig. 3.
Inventor:
Howard B. Davis,
By Butler & Denny
Attorneys.

Patented July 17, 1923.

1,462,030

UNITED STATES PATENT OFFICE.

HOWARD B. DAVIS, OF MILLVILLE, NEW JERSEY.

GLASS-CUTTING MACHINE.

Application filed August 16, 1920. Serial No. 403,991.

*To all whom it may concern:*

Be it known that I, HOWARD B. DAVIS, a citizen of the United States, residing at Millville, in the county of Cumberland and State of New Jersey, have invented an Improved Glass-Cutting Machine, of which the following is a specification.

This invention is a machine designed for cutting glass tubes internally for the purpose of dividing them into rings or circular sections simply, conveniently, rapidly and efficiently.

In its preferred form, the machine comprises a bed provided with rollers for supporting the tubes to be divided into sections, a bar provided with a cutter adapted to be inserted into the tubes and a stop or gage for limiting the insertion of the cutter so as to form sections of the same desired size, a hinged strut to which the rod is fixed in adjustable relation and an adjustable bearing upon which the strut is fulcrumed. Means may be used for manually engaging and automatically disengaging the cutter with relation to the tube.

The characteristic features of the invention are set forth in the following description and the accompanying drawing in illustration thereof;

In the drawings, Fig. 1 is a part sectional side elevation of a machine embodying the invention in operative relation to a glass tube which is partially broken away for the purpose of illustration; Fig. 2 is a sectional view taken on the lins 2—2 of Fig. 1; and Fig. 3 is a broken part sectional side elevation of a modified form of the machine with parts shown out of operative position.

The machine comprises the frame base 1 provided with the uprights or standards 2 and 3. Pointed screws or bolts 4 and 5 are set horizontally in the tops of the uprights and provide end bearings for the parallel shafts 6, each having circular disks or rollers 7 thereon. The shafts and rollers, which are properly spaced therefor, provide a bed for holding glass tubes 8 which are movable longitudinally and can be rolled thereon with the minimum frictional resistance, the tubes being held against lateral movement and turned about a constant axis by their engagement in the bights of the complementary rollers.

A bearing 9, in the vertical plane midway of the shafts 6, is provided with a reduced squared section 10, which is movable in the vertical slot 11 of the upright 3, and with a wing nut 12 engaged on the projecting threaded end of the bearing, whereby it is adapted to be set at different elevations.

A strut 13 is hinged at its lower end to the bearing 9 by means of the pin 14 and is provided at its upper end with a transverse aperture 15 in the longitudinal vertical plane of the bearing.

A rod 16 is movable longitudinally through the aperture 15 and is adapted to be fixed to the strut or bearing 13 by the set screw 17 movable in the top thereof, into the aperture.

The rod 16, with the diamond or cutter 18 fixed in the forward end thereof, is adapted to be entered through the end of and into the glass tube 8.

A stop or gage 19, fixed adjustably on the rod 16 by the collar 20 and the set screw 21, limits the length of the rod in the glass tube as well as the position of the cutter 18 and the length of the tube section cut thereby, the length depending upon the character of the sections desired and the finished rings to be formed therefrom. A handle 22, fixed in adjustable relation to the rod 16 by the set screw 23, provides means for transferring pressure from the hand of the operative to the rod 16 and to the cutter 18 as the tube 8 is rolled manually in contact therewith on the rollers 7.

A section of the tube 8 having been cut, the rod 16 is elevated to disengage the cutter from the tube and the rod and tube are separated, so that the section that has been cut can be detached by moving either the tube or the rod or both rearwardly, the rod 16 being permitted the movements specified by the movability of the strut 13.

The thickness of the tube operated upon will determine the elevation at which the bearing 9 will be set.

The rod 16 with the cutter 18 thereon may be moved vertically into and out of contact with the tube 9 by a link 24 containing a slot 25 in its top, through which the rod passes. The link is operated by a lever 26 hinged thereto by means of the pin 27, the lever being fulcrumed on a strut 28 carried by the frame and provided with a weight 29 acting counter to the link.

The lever is pressed down against the action of the weight and depresses the link which acts through the rod to press the cutter against the tube as it is rolled on its bed.

The cutting operation having been effected, the lever is released, the link is elevated automatically by the action of the weight, and the rod with the cutter thereon is elevated by the link, thus disengaging the tube.

As illustrated in Fig. 3, the parts 24 to 29 inclusive may be omitted, which may be desirable in operating upon small tubes.

Having described my invention, I claim:

1. In a glass tube cutting machine, the combination with a frame, of a pair of shafts revolubly supported thereby, complementary disks carried by said shafts to provide rolling supporting means, an adjustable bearing carried by said frame, a strut connected in hinged relation to said bearing, a rod adapted to be fixed in longitudinally adjustable relation to said strut, a cutter carried by said rod, and an adjustable gage stop carried by said rod.

2. In a glass tube cutting machine, a bed having rotatable members adapted for supporting and controlling a tube as it is revolved, a rod provided with a cutter adapted for entering said tube, a gage stop on said rod for limiting its entry into a tube, and supporting means for said rod whereby said cutter can be elevated and retracted.

3. In a glass tube cutting machine, a bed adapted for supporting a tube, a rod provided with a cutter adapted to be entered in a tube on said bed, means for supporting said rod so that it can be moved transversely, and means for moving said rod automatically with relation to a tube on said bed.

In testimony whereof I have hereunto set my name this 15th day of August, 1920.

HOWARD B. DAVIS.